2 Sheets—Sheet 1.

M. NEVINGER & R. SELDON.
Machine for Digging Potatoes.

No. 222,199. Patented Dec. 2, 1879.

Attest:
H. H. Schott
D. P. Cowl

Inventor:
Michael Nevinger
Robert Seldon

2 Sheets—Sheet 2.
M. NEVINGER & R. SELDON.
Machine for Digging Potatoes.
No. 222,199. Patented Dec. 2, 1879.
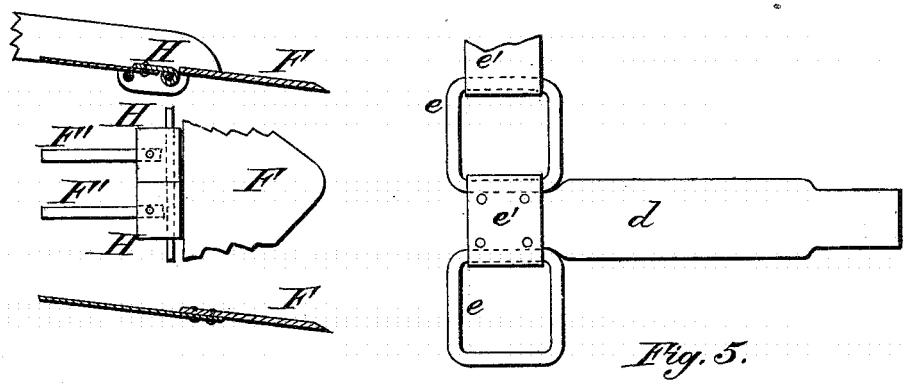
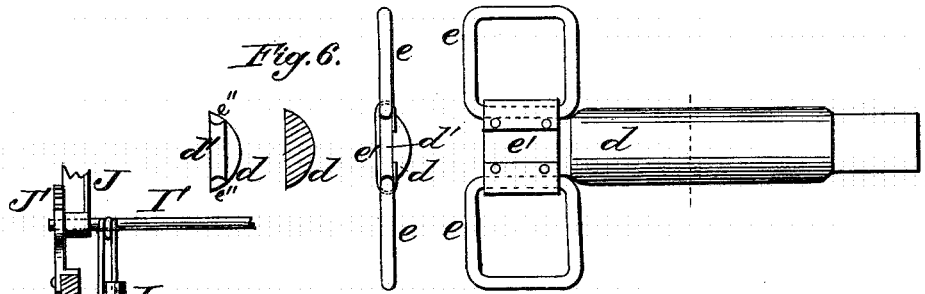
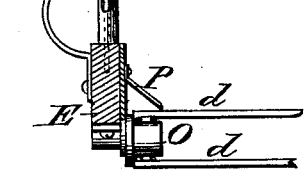
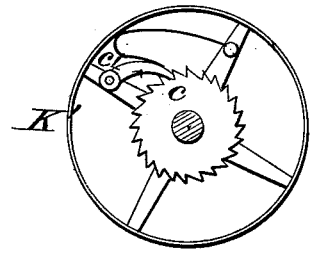

UNITED STATES PATENT OFFICE.

MICHAEL NEVINGER, OF ATTICA, AND ROBERT SELDON, OF STAFFORD, NEW YORK.

IMPROVEMENT IN MACHINES FOR DIGGING POTATOES.

Specification forming part of Letters Patent No. 222,199, dated December 2, 1879; application filed September 12, 1879.

*To all whom it may concern:*

Be it known that we, MICHAEL NEVINGER, of Attica, Wyoming county, and ROBERT SELDON, of Stafford, in the county of Genesee and State of New York, have invented certain new and useful Improvements in Machines for Digging Potatoes; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to improve that class of machines used for digging potatoes in such a manner as to remedy most of the defects in their operation which have hitherto prevented them from coming into general use; and this is accomplished rather by a perfection of details than by a wholly novel plan of machine, as will be apparent from the following description.

Figure 1:
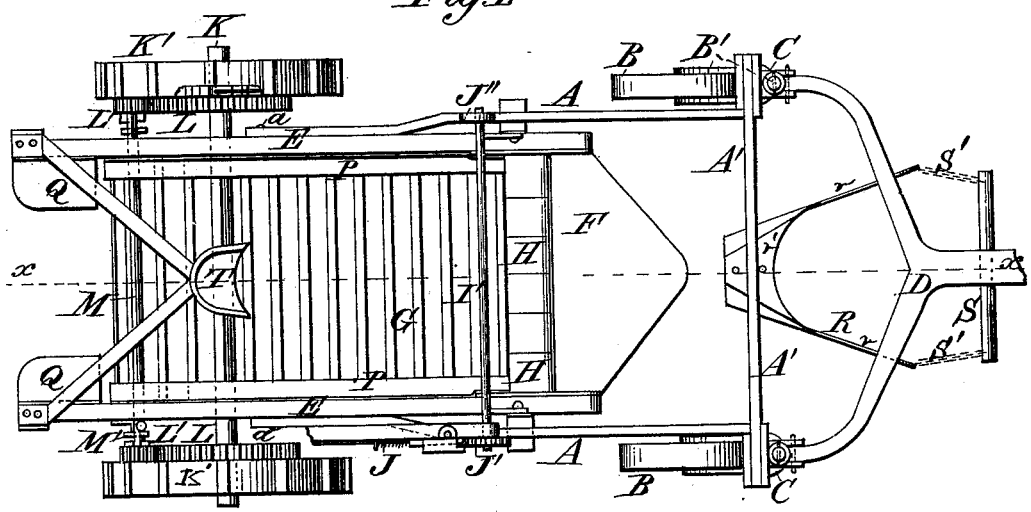
Figure 2:
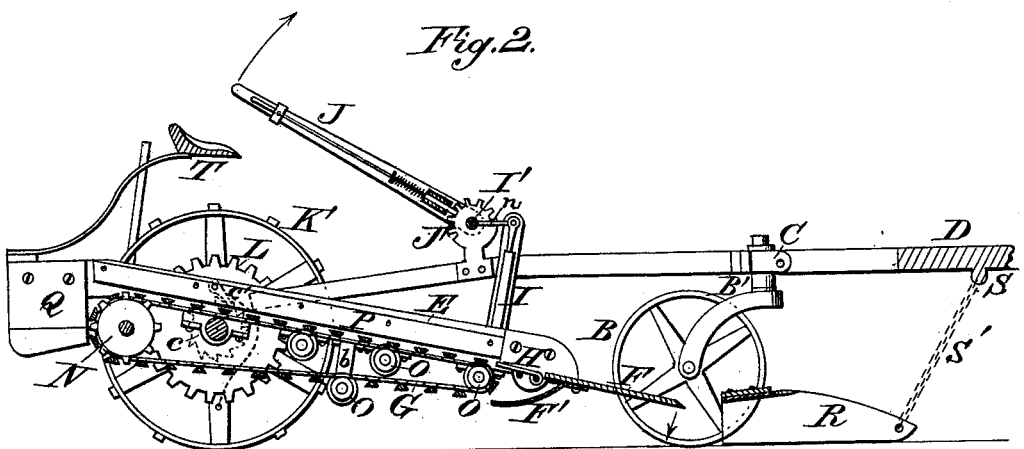
Figure 3:
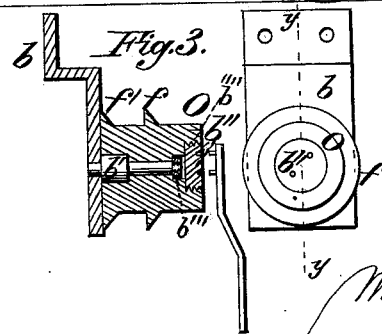

In the accompanying drawings, Figure 1 is a plan of the machine, showing the relative positions of the different parts as viewed from above. Fig. 2 is a vertical longitudinal section on the line *x x* of Fig. 1, and shows the relative positions, vertically, of the several parts when the excavator is raised from the ground. Fig. 3 shows an enlarged section and side view of one of the carrying-rolls which support the endless chains. Fig. 4 shows detailed views, partly in section, of the excavator and sectional apron over which the earth and potatoes pass on their way to the screen. Fig. 5 shows enlarged views of a part of one of the endless chains, illustrating its construction and the method of connecting the screen-bars thereto. Fig. 6 shows an end view and section of one of the screen-bars. Fig. 7 illustrates the manner in which the lifting apparatus is connected to the screen-frame. Fig. 8 is an enlarged view of one of the driving-wheels, with the pawl and ratchet, by means of which motion is given to the axle, and through it to the screen.

In constructing this machine the metallic forward frame is composed of two side pieces, A, preferably formed of bar-iron of rectangular section, and connected at their front ends by the cross-bar A', which carries the journal-boxes C, forming the pivotal bearings for the forward trailing-wheels, B, and also the clips to which the tongue D is attached. This method of constructing these parts of the machine gives the frame great strength and rigidity with the expenditure of a small amount of metal, thus securing a light weight upon the forward wheels. The method of attaching these wheels to the frame by means of the shank and pivotal journals B' allows great facility of movement, so that the machine can be readily turned in any direction, the forward part of the frame passing over the wheels, which assume the new direction as readily and in the same manner as the common caster-wheel in use upon articles of furniture.

Attached to the frame just described by the pivotal joints *a* is the screen-frame E, which may be of wood or metal, as preferred. Its sides are connected at their forward ends by the triangular metallic excavator F, to the under side of which is secured the guard-plate F', which prevents all extraneous matters from entering the screen G, and also forms a chute for the discharge of bowlders or other matters which may be allowed to pass downward through the sectional apron H. This apron serves the purpose of a bridge between the excavator and the screen, and, being formed in sections hinged to the rear portion of the excavator, it is evident that any one or more of them may be lifted to allow anything to pass through that would be likely to impede the motion of or injure the screen.

The front end of this screen-frame, together with the excavator, is made vertically adjustable by means of the standards or connections I, the upper ends of which are attached to arms *n*, projecting from the rock-shaft I', which rock-shaft is actuated by the driver of the machine through the agency of the pawl-lever J, which comes into a convenient position to enable him to operate it without leaving his seat. The pawl of this lever J catches in a segmental gear, J', attached to one of the side bars, A, of the frame, which gear also forms the journal-bearing for one end of the rock-shaft, its opposite end being carried in the bearing J'', attached to the opposite side of the frame. It will therefore be apparent that the driver may, without leaving his seat, raise the excavator entirely clear from the ground, or allow it to penetrate to such depth as may be needed to go below the potatoes to be raised.

It will also be seen that the standards I can, if desired, be made with an outward curve, so as to allow a free passage for the tops as they pass onto the screen.

Revolving in suitable journal-boxes attached to the under side of the screen-frame E is the main axle K, upon each end of which is placed so as to revolve thereon a broad-faced and spurred wheel, K'. The spurs and broad tread of these wheels enable them to take a firm hold of the earth, so as to drive the screen without slipping. Ratchet-wheels c are also attached to the axle K, and by means of the spring-pawls c', attached to the wheels K', cause the latter to rotate the axle when the machine is moving forward, but not in backing.

This arrangement of mechanism is clearly shown in Fig. 8 of the drawings, and will be found to be an excellent one, not only for these machines, but for others in which a similar movement is advantageous.

Secured firmly to the axle K, outside of the frame E, are the two large gear-wheels L, which engage with pinions L' upon each end of the shaft M, which revolves in journal-bearings attached to the frame E. These pinions L' are loose upon the shaft M, being made to revolve therewith by means of the clutches M', the operating-levers of which are also brought within easy reach of the driver.

Upon the shaft M are secured two sprocket-wheels, N, from which motion is communicated to the screen G. This screen consists of a series of united metallic bars, $d$, flat upon one side and rounded upon the other, thus giving them comparatively sharp edges, which form is found to assist greatly in the removal of the roots from the tubers, as well as in breaking up clods and cakes of earth. The flat side of the bars, being up as the screen moves along, keeps their sharp edges always in the most effective position.

The connection $e\ e'$, by which the ends of the bars $d$ are united, is of a peculiar construction, as is clearly shown in Fig. 5 of the drawings. The part $e$ is of round iron, and with a rectangular opening, through which the teeth of the sprocket-wheels pass. These links are connected to each other and to the bars $d$ by the metallic clasps $e'$, which may be of wrought or malleable iron, having an opening in one side, through which the links $e$ are passed in uniting the several parts.

The ends $d'$ of the bars $d$ are of the form shown in Fig. 6, being flattened and hollowed out at the edges $e''$, so that when the end of the bar $d$ is pushed into a clasp, after the links are in place, its hollowed or concave edges bear against the rounded links, which are held in place like a journal in its bearing, having a rotative motion, but no movement in any other direction. The clasps $e'$ may then be riveted through the ends of the bars, or otherwise secured, the whole forming, when properly united, an endless screen of great strength and simplicity of construction.

In order to properly support this endless screen G, a series of flanged rollers, $o$, are secured to each side of the frame E, in sufficient number to support the screen without material deflection, and at the same time avoid the strain and friction which would ensue were it strained like a belt over sprocket-wheels at each end. The construction of these rollers is as follows: A standard, $b$, (see Fig. 3,) having its upper end properly shaped for attachment to the frame E, is provided near its lower end with a stud, $b'$, onto which the roller $o$ is slipped and secured by means of a nut, $b'''$, screwed onto the end of the stud within a recess, $b''''$, formed in the end of the roller, which recess is afterward stopped by the screw-plug $b''$, leaving a cavity in the end of the roller between the stud and screw-plug sufficiently large to contain a supply of oil. Encircling the roller $o$ are the two flanges $f$ and $f'$, which form the lateral guides for the screen as it travels over them.

Metallic covering-pieces P are secured to the inner sides of the frame E, covering the ends of the screen-bars and preventing the entanglement of the tops with the rollers $o$ as they are carried to the rear by the moving screen; and in order to prevent them from spreading as they leave the machine, and to gather them, as well as the potatoes, into a more compact row as they fall upon the ground, two inclined aprons, Q, one on each side, are attached to the rear inner ends of the frame E, so as to throw both vines and tubers into rows between them. In order to gather the vines together on top of the rows, so that they shall pass regularly onto the middle of the excavator and screen, a wallower, R, is attached by means of chains to the cross-bar S upon the pole D. The inclined sides $r$ of this wallower are connected together at their inner ends by the short top plate, $r'$, the wallower being open at bottom, and also at top, beyond the short plate $r'$. The inclined sides of the wallower are perforated near their front ends for the attachment of chains S', connecting them with the cross-bar S, passing along over the rows, gathering all the straggling vines into a line directly over the middle of the row, and corresponding with the longitudinal axis of the machine, so that they pass onto it in the best possible position to prevent entanglement with its working parts.

A driver's seat, T, is mounted upon suitable springs attached to the frame E, and is placed in such a position as to give the driver full control over the mechanism at all times.

Having thus described our invention, we claim as new, and desire to secure by Letters Patent, the following:

1. The wallower R, open at its bottom, and consisting of the inclined perforated sides $r$, connected together at their inner ends by the short top plate, $r'$, in combination with the plate D, cross-bar S, and chains S', substantially as described, and for the purpose set forth.

2. In a potato-digging machine, the combination of the sectional apron H with the traveling screen G, excavator F, and guard-plate F', substantially as described, and for the purpose set forth.

3. In a potato-digging machine, the combination of the sectional apron H with the excavator and traveling screen, as and for the purpose described.

4. The traveling screen herein described, composed of bars $d$, flat upon their upper faces and rounded on their under faces, and having flattened end $d'$, with rounded edges $e''$, embracing opposite sides of the rounded links $e\,e$, and held in place by the open metallic clasps $e'$, substantially as described.

5. The angular standard $b$, provided near its lower end with the stud $b'$, in combination with the roller $o$, having the flanges $f\,f'$, and recess $b''''$, nut $b'''$, and screw-plug $b''$, substantially as described, and for the purpose set forth.

In testimony that we claim the foregoing we have hereunto set our hands this 29th day of August, 1879.

MICHAEL NEVINGER.
ROBERT SELDON.

Witnesses:
E. A. DICK,
JOHN C. TASKER.